United States Patent
Sakai et al.

[15] 3,662,075
[45] May 9, 1972

[54] METHOD AND SYSTEM FOR CONTROLLING ELECTRIC FURNACES AS A FUNCTION OF POWER FACTOR

[72] Inventors: Makoto Sakai; Shinichi Miyao, both of Niigata, Japan

[73] Assignee: Nippon Kokan Kabushiki Kaisha

[22] Filed: Oct. 22, 1970

[21] Appl. No.: 82,898

[30] Foreign Application Priority Data

Oct. 30, 1969  Japan..................................44/86640

[52] U.S. Cl..................................................13/13
[51] Int. Cl..................................................F27d 11/10
[58] Field of Search..................................13/12, 13

[56] References Cited

UNITED STATES PATENTS 3,043,894  7/1962  Ravenscroft.............................13/12
3,432,604  3/1969  Harbaugh.................................13/13
3,435,121  3/1969  Jackson....................................13/13

Primary Examiner—Harold Broome
Assistant Examiner—R. N. Envall, Jr.
Attorney—Flynn & Frishauf

[57] ABSTRACT

In an electric furnace control system of the type wherein an electrode driving mechanism is operated by the electrode control signals provided by an automatic current regulator responsive to the current flowing through the electrode, there are provided a program control connected between the automatic current regulator and the electrode driving mechanism for transmitting the electrode control signals to the electrode driving mechanism, and a power factor regulator responsive to the actual power factor of the furnace for controlling the program control.

10 Claims, 2 Drawing Figures

3,662,075

METHOD AND SYSTEM FOR CONTROLLING ELECTRIC FURNACES AS A FUNCTION OF POWER FACTOR

BACKGROUND OF THE INVENTION

This invention relates to a method and system for controlling an electric furnace by means of a power factor apparatus, and more particularly to a method and system for controlling an electric furnace for refining steel by regulating the position of the electrode to enable the furnace to operate near the maximum power optimum for the furnace.

The operating characteristics of an electric furnace are greatly influenced by the furnace capacity, the type of the metal to be melted or refined, the electric supply apparatus, the operating voltage and current, conditions in the furnace and another factors. The power factor of the furnace generally decreases with the capacity of the furnace with the result that the active power does not increase. This defect has limited the capacity of the large size furnace.

The defects of prior electric furnace will be described below with reference to the characteristics shown in FIG. 1 of the accompanying drawing.

As shown by the characteristic curves of FIG. 1, under a constant operating voltage V, as the electrode current increases the power factor $p.f.$ decreases and the power $p$ increases up to a maximum power $p_{max}$, and then decreases significantly. At a short circuit current $I_s$ the power decreases to zero.

For this reason, it has been the practice to operate the furnace below the maximum power, that is along the positive portion of the current-power characteristic curve. However, in a large capacity furnace it is required to operate it near the power factor limit due to the inherent reactance of the furnace. For this reason, the operator often operates the furnace along the negative portion of the current-power characteristic without being aware of this.

This causes not only abnormal operating conditions such as a decrease in the power consumption and lowering of the melt zone in the furnace, but also abnormal feeding of the electrode and corrosion of the furnace bottom.

As can be clearly noted from the characteristics shown in FIG. 1, when the furnace is operated along the negative portion of the current-power characteristic, notwithstanding the decrease in the power $p$, the reactive power $p_r$ increases thus resulting in the increase in the power and in the decrease in the power factor. Decrease in the effective power causes the reaction zone in the furnace to lower.

This also forms a so-called dead zone at the central portion and near the peripheral wall of the furnace wherein effective reaction does not occur. In extreme cases, the operating condition of the furnace are greatly affected due to irregularities of the furnace bottom.

Since the current power characteristic is nearly flat near the maximum power, it is difficult to determine whether the furnace is operating along the positive portion or the negative portion of the power curve by observing the voltmeter and ammeter which are provided for each electrode.

Since the furnace operates along the positive or negative portion mainly due to the reactance in the furnace, even when the electrode is operated according to a standard program the operator often continues the operation without being aware of the fact that the furnace is operating along the negative portion.

In addition, at the time of changing the operating voltage by changing the tap of the source transformer, and at the time of changing the set value of the automatic electrode regulating device and when the primary voltage of the transformer varies, the furnace operation may enter deeply into the negative side of the characteristic.

Usually, the electrode of the furnace is controlled manually or automatically. However, to provide reasonal operation of the furnace, automatic control is desired. Various types of regulating systems have been proposed including a current regulating system, an impedance regulating system, a resistance regulating system and a power regulating system.

However, each of these prior systems does not incorporate the power factor limit feature. For example, the current regulating system operates to regulate the furnace current to a definite value. The current regulating system cannot descriminate whether the power factor limit is exceeded or not.

On the other hand, the impedance regulating system functions to maintain the ratio E/I at a constant value whereas the resistance regulating system operates to maintain the resistance at a constant value. Thus, the regulated values are scaler quantities. For this reason, it has been long desired to provide an electric furnace control method which regulates the power factor, a vector quantity.

In prior electrode regulating systems, current has been supplied from the primary side, tertiary side or secondary side of the source transformer through a current transformer. As the electrode voltage, use is made of line of electrode voltage or phase of electrode voltage. Except for certain types, the regulating circuit is constructed to respond to current or voltage or both.

It is therefore a principal object of this invention to provide a novel electric furnace control system to operate the furnace at a point close to but not exceeding a power factor limit which is present corresponding to the maximum power characteristic of the furnace. Another object of this invention is to provide a novel electric furnace control system capable of improving the power factor and hence the capacity of an electric furnace, especially a furnace of large size.

SUMMARY OF THE INVENTION

According to this invention, in addition to the voltage and current, power factor limits under various operating conditions are predetermined by calculation or actual measurement and means is provided for each electrode for detecting the power factor as the phase difference between voltage and current so as to asure that the power factor limit at the maximum power is not exceeded.

In accordance with one aspect of this invention there is provided a method of controlling an electric furnace of the type wherein the power input to the furnace is controlled in accordance with the current, comprising the steps of predetermining a power factor limit for the maximum power under various operating conditions, detecting the actual power factor of each electrode and automatically regulating the position of the electrode in the furnace according to the actual power factor whereby to operate the furnace at a point close to but not exceeding the preset power factor limit.

According another feature of the invention there is provided an electric furnace control system comprising an electrode driving mechanism, an automatic current regulator responsive to the current flowing through the electrode for providing electrode control signals, a program control connected between the automatic current regulator and the electrode driving mechanism for transmitting electrode control signals to the electrode driving mechanism and a power factor regulator responsive to the actual power factor of the furnace for controlling the program control.

DESCRIPTION OF THE PREFERRED EMBODIMENT

Figure 1:
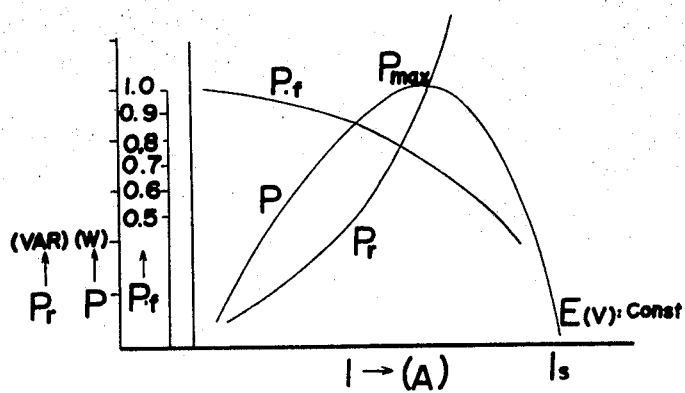
FIG. 1 shows various characteristics of an electric furnace.
Figure 2:
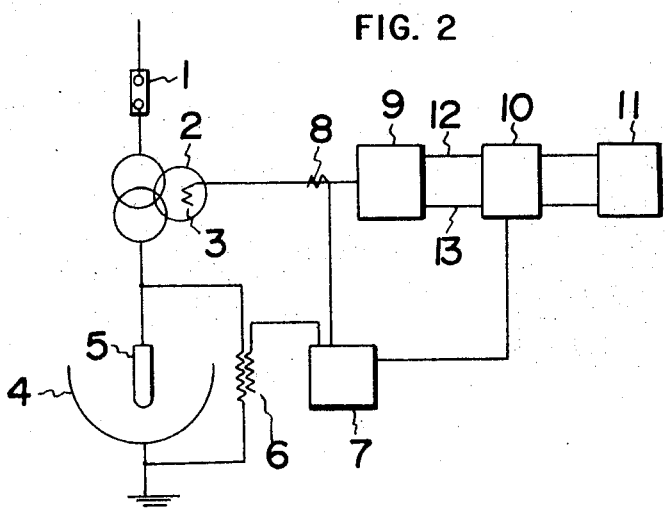
FIG. 2 is a block diagram of a control system for an electric furnace embodying the present invention.

The control system shown in FIG. 2 is adapted to control an electric furnace of a rating of 25,000 Kva for use to manufacture SiMn alloy. The electric furnace 4 having electrodes 5 (only one is shown) is fed from a source (not shown) through a circuit breaker 1 and a transformer 2. The automatic control system for the furnace comprises an automatic current regulator 9 energized from the electrode feed current through a current transformer 3 for providing a raise signal 12 and a lower signal 13 to an electrode driving mechanism 11 through a program control 10 (including, for example, an auxiliary relay board). The program control 10 also receives a signal from a power factor regulator 7 which is energized by the electrode current through an auxiliary current transformer 8 and an instrument transformer 6 connected across electrode 5 and the furnace bottom.

Denoting the electrode voltage by $e_1$ and the regulated value of the electrode current by $i_1$, the power factor limit $p_{f1}$ and electrode current $i_2$ at the maximum power are determined by calculation or actual measurement. Thus, the set electrode current $i_3$ is equal to or less than $I_2$. Even when the actual power factor is higher than the power factor limit, if $i_1 < i_3$, the automatic current regulator 9 provides a lower signal to the electrode driving mechanism 11 through program control 10 to lower the electrode to bring $i_3$ near $i_1$, thus increasing the power. Conversely, in the case of $i_1 > i_3$, a raise signal is provided to raise electrode 5 to decrease $i_1$.

When the actual power factor decreases below the power factor limit and when $i_1 < i_3$, the automatic current regulator 9 provides a lower signal but, under the control of the power factor regulator 7, the program control 10 converts the lower signal to a raise signal whereby the electrode is raised to decrease the current. In this manner, decrease in the power is prevented until the power factor is restored to the power factor limit at which the regulating operation is stopped.

In the case where $i_1 > i_3$, the raise signal from the automatic current regulator 9 is supplied to the electrode operating mechanism 11 through program control 10 without being modified thereby.

In a three phase furnace, the operation described above is performed independently for each phase. Thus, the control system of this invention can improve the operating characteristics of the electric furnace and can save power consumption.

While in the above, the operation of the control system is described when the power factor limit is exceeded and the furnace tends to operate along the negative characteristic, the program control can provide the following operation which are selected according to the operating conditions of the furnace:

1. The automatic electrode control is stopped when the power factor drops below the power factor limit and an alarm device is operated;

2. Voltage is increased by a pre-set value and the automatic electrode control is continued; and 3. Set current value $i_3$ is decreased and when the positive characteristic is reached, the regulation of $i_1$ is stopped.

In addition to the above described four types of programmed control, it is also possible to set a program most suitable for the operating conditions of the furnace.

It will thus be clear that the invention provides a novel furnace control system which can readily control the power to the maximum extent within the range of the electrical characteristics inherent to the furnace, thus improving the system power factor and saving power.

Where it is desired to operate at a selected power factor for the purpose of stabilizing the melt zone, the setting of the power factor regulator is adjusted accordingly.

Where the furnace bed tends to rise, two different operating points can be set in the negative region so that the furnace can operate under a negative power factor, thus preventing the tendency of the furnace bed to rise by increasing the depth of the melt zone. The novel control is especially applicable to large capacity furnaces whose capacity is limited by the inherent power factor characteristic such as Heroult type or Girod type electric furnaces for steel refining to control the maximum power and to correct the height of the furnace bed.

We claim:

1. A method of controlling an electric furnace of the type wherein the power input to the furnace is controlled in accordance with the current, comprising the steps of:
   predetermining a power factor limit for the maximum power under various operating conditions;
   detecting the actual power factor of each electrode; and
   automatically regulating the position of said electrode in the furnace according to said actual power factor and said predetermined power factor limit, whereby to operate the furnace at a point close to or at, but not exceeding, said power factor limit.

2. An electric furnace control system comprising:
   an electrode driving mechanism; an automatic current regulator generating a first current responsive to the current flowing through said electrode; a power factor regulator for detecting the actual power factor of said furnace electrode; and a program control unit connected between said automatic current regulator and said electrode driving mechanism, and responsive to the output of said power factor regulator, for transmitting electrode control signals to said electrode driving mechanism to regulate the position of said electrode in the furnace to cause said actual power factor to at least approach a predetermined power factor limit.

3. The method of claim 1 wherein said furnace is operated close to said power factor limit.

4. The method of claim 1 wherein the height of the electrode in the furnace is regulated in accordance with said actual power factor and said predetermined power factor limit.

5. The method of claim 1 wherein said actual power factor is detected by detecting the electrode current and the electrode voltage.

6. The method of claim 1 wherein said step of regulating the position of said electrode includes operating on a current corresponding to said electrode current as a function of the detected actual power factor and generating a control current to vary the electrode position in order to cause said control current to approach, but not exceed, said current corresponding to said electrode current.

7. An electric furnace control system according to claim 2 wherein said program control unit causes said actual power factor to be close to but not exceed said predetermined power factor limit.

6 An electric furnace control system according to claim 2 wherein said electrode drive mechanism regulates the height of said electrode in the furnace.

9. An electric furnace control system according to claim 2 wherein said power factor regulator is responsive to the electrode current and electrode voltage.

10. An electric furnace control system according to claim 2 wherein said program control system according to claim 2 unit varies the output signal from said current regulator as a function of the output of said power factor regulator to thereby provide said control signals.

* * * * *